(12) United States Patent
Sture

(10) Patent No.: US 8,678,714 B2
(45) Date of Patent: Mar. 25, 2014

(54) MILLING TOOL, AND MILLING INSERT KIT

(75) Inventor: Sjöö Sture, Gävle (SE)

(73) Assignee: Sandvik Intellectual Property AB, Sandviken (SE)

( * ) Notice: Subject to any disclaimer, the term of this patent is extended or adjusted under 35 U.S.C. 154(b) by 28 days.

(21) Appl. No.: 13/434,192

(22) Filed: Mar. 29, 2012

(65) Prior Publication Data
US 2012/0257935 A1 Oct. 11, 2012

(30) Foreign Application Priority Data

Apr. 8, 2011 (SE) .................................. 1150309-1

(51) Int. Cl.
B23F 5/22 (2006.01)
(52) U.S. Cl.
USPC .................................. 407/23; 407/25; 407/29
(58) Field of Classification Search
USPC .............................. 407/23, 25, 24, 26, 29, 21
See application file for complete search history.

(56) References Cited

U.S. PATENT DOCUMENTS

| 3,818,561 | A | * | 6/1974 | Montana et al. | ................ | 407/46 |
| 4,218,159 | A | | 8/1980 | Langen | | |
| 5,123,786 | A | * | 6/1992 | Yates et al. | ...................... | 407/38 |
| 5,593,254 | A | | 1/1997 | Peters | | |
| 6,004,080 | A | * | 12/1999 | Qvarth et al. | ................... | 407/36 |
| 7,118,311 | B2 | * | 10/2006 | Astrom | ........................... | 407/46 |
| 7,402,010 | B2 | * | 7/2008 | Bauer et al. | .................... | 409/234 |

FOREIGN PATENT DOCUMENTS

| EP | 2 072 162 | | 6/2009 |
| JP | 52022196 A | * | 2/1977 |
| JP | 60099520 A | * | 6/1985 |
| JP | 61004619 A | * | 1/1986 |
| JP | 62166920 A | * | 7/1987 |
| JP | 62193729 A | * | 8/1987 |
| JP | 2001-353621 | | 12/2001 |
| RU | 2147495 C1 | * | 4/2000 |
| WO | WO 9911415 A1 | * | 3/1999 |

* cited by examiner

Primary Examiner — Daniel Howell
Assistant Examiner — Nicole N Ramos
(74) Attorney, Agent, or Firm — Morgan, Lewis & Bockius LLP

(57) ABSTRACT

Milling tool and milling insert kit are provided for the gash milling of a workpiece. The tool comprises a tool body that defines a rotation axis and has a first end, an opposite second end, and a peripheral surface that extends around the rotation axis between the first end and the second end. A large number of separated seats, which are arranged one after the other in the tool body along a line and receive one each of corresponding number of replaceable milling inserts, comprise a primary main cutting edge and a secondary main cutting edge that converge to each other. The milling inserts comprise outer milling inserts, which project from the tool body by a first length from the rotation axis, and inner milling inserts, which project from the tool body by a second length from the rotation axis. The first length is considerably greater than the second length.

20 Claims, 9 Drawing Sheets

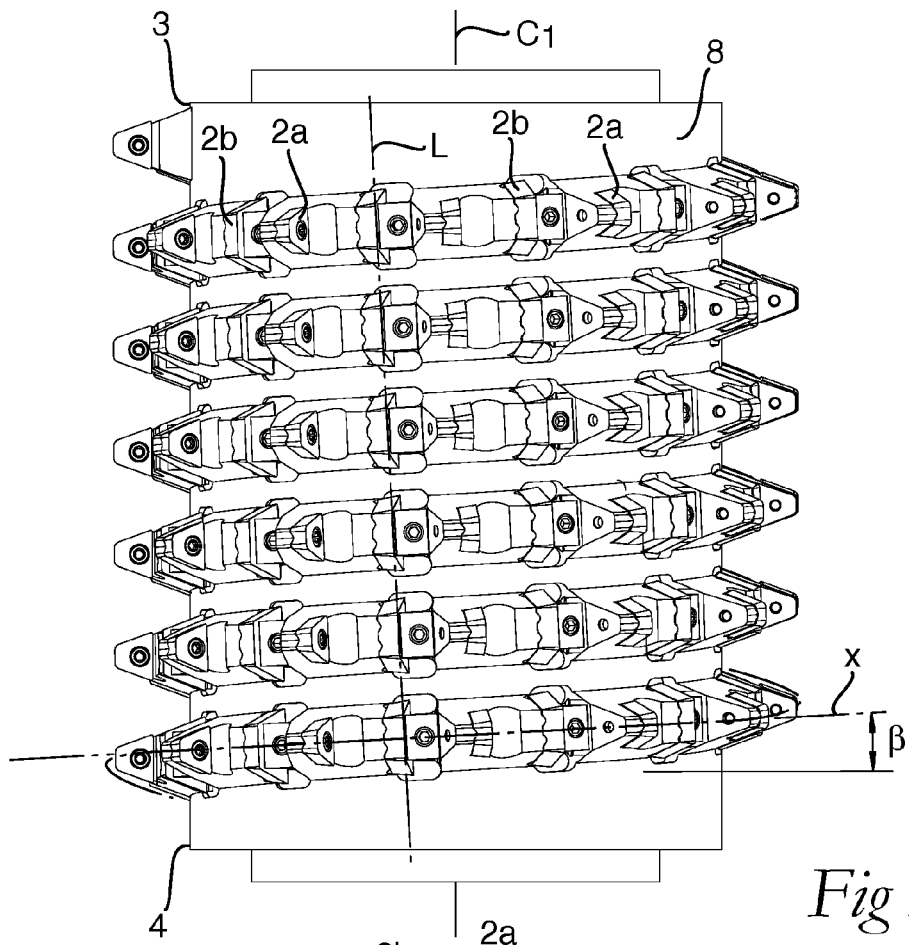
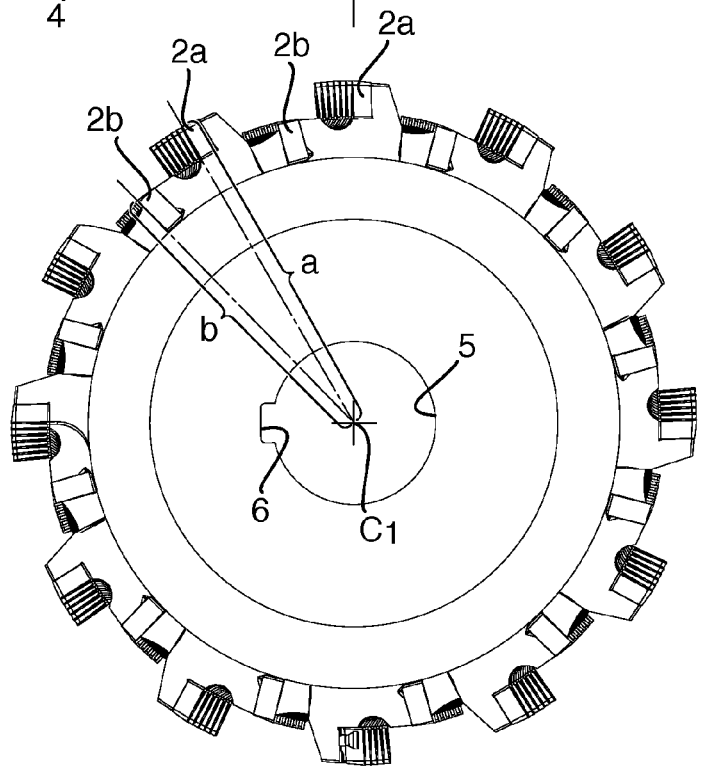
Fig 2
Fig 3

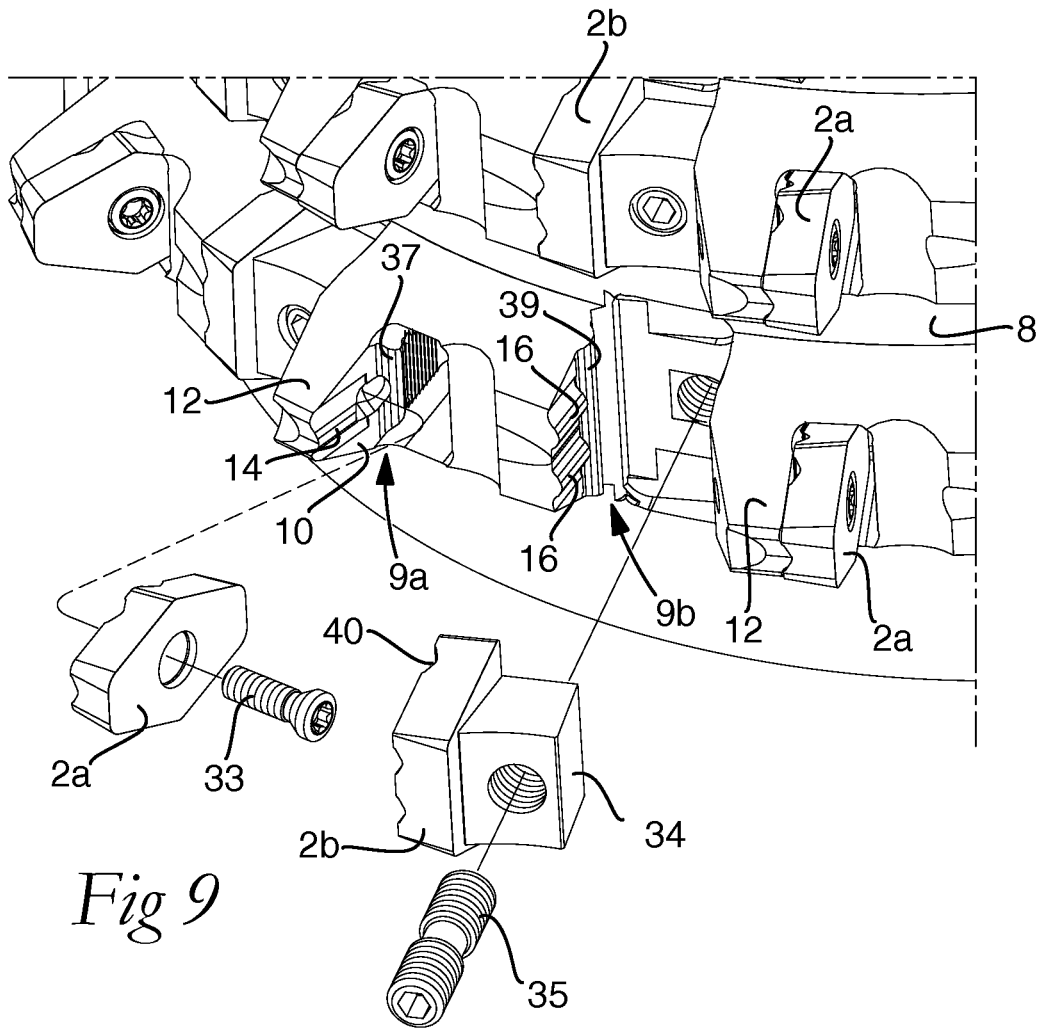
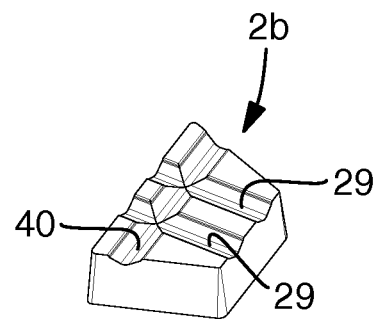

MILLING TOOL, AND MILLING INSERT KIT

RELATED APPLICATION DATA

This application is based on and claims priority under 37 U.S.C. §119 to Swedish Application No. 1150309-1, filed 8 Apr. 2011, the entire contents of which are incorporated herein by reference.

FIELD OF THE INVENTION

The present invention relates to a milling tool for gash milling, such as groove milling, slotting, gear milling, in particular so-called hobbing, etc. More particularly, the invention relates to a milling tool according to the preamble of claim 1, see U.S. Pat. No. 5,593,254, and to a milling insert kit according to the preamble of claim 17.

It is known to manufacture gear milling tools having fixed milling inserts that are formed by cutting machining of the tool body. This invention relates to a milling tool wherein the milling inserts instead are formed of a plurality of replaceable milling inserts that are arranged one after the other along a succession line that extends around the tool body.

BACKGROUND OF THE INVENTION AND PRIOR ART

Milling tools are provided for the gear milling of gear wheels in different modules Mn depending on the size of the gear wheels to be manufactured. There are modules from Mn=1 for very small gear wheels, to Mn=22 or more for very great gear wheels. The tool according to this invention can be used for gear wheels of all modules but are particularly suitable for the milling of gear wheels with Mn=6 to Mn=22, particularly gear wheels with Mn=8 to Mn=16.

U.S. Pat. No. 5,593,254 shows a milling tool formed for the hobbing of workpieces having cogs, such as gear wheels, racks and the like. The milling tool comprises a tool body that defines a rotation axis and should have a first end, an opposite second end, and a peripheral surface that extends around the rotation axis between the first end and the second one. A large number of separated seats are arranged one after the other in the tool body along a helix line having a constant pitch. A corresponding large number of replaceable milling inserts each one of which comprises an under side, an opposite upper side that forms a chip surface, a circumferential edge side that connects the upper side and the under side, an axis that extends through the upper side and the under side, and at least one primary main cutting edge and a secondary main cutting edge, which converge to each other and are formed where the edge side meets the upper side. Each seat is formed to receive one of the milling inserts each one of which projects from the tool body for cutting engagement with a gash of said workpiece. The milling inserts are fastened by a screw that extends through an eccentric hole in the milling insert from the upper side to the under side. The milling insert has a ridge on the under side that is in engagement with a groove in the seat. The chip surface leans in relation to a radial plane in respect of the rotation axis in such a way that an error of the involute of the cogs that are to be milled is obtained.

EP-A-2 072 162 shows a milling tool formed for the hobbing of a workpiece having cogs, such as gear wheels, racks and the like. The milling tool comprises a tool body having a number of seats that are arranged one after the other along a helix line having a constant pitch. The milling tool also comprises a corresponding number of milling inserts each one of which comprises a row of three teeth. Each tooth is formed for engagement with a gash of the workpiece. Each milling insert has an upper side that forms a chip surface for each tooth. The chip surfaces for the three teeth are lying in a common plane, which means that a normal of the chip surface will form an acute angle with a tangent of the helix line where the helix line intersects the chip surface at least for two of the teeth.

JP-A-2001-353621 shows a further example of a milling tool for hobbing. The milling tool comprises a number of milling inserts each one of which is formed with a row of teeth forming a chip surface. The chip surfaces lean in relation to a radial plane in respect of the rotation axis in the same way as in the milling tool shown in U.S. Pat. No. 5,593,254.

U.S. Pat. No. 5,593,254, EP-A-2 072 162, and JP-A-2001-353621, as well as the present invention, relate to a milling tool wherein the seats of the milling inserts extend essentially radially. There are also milling tools for hobbing wherein the seats of the milling inserts extend essentially tangentially. An example of such a tool having tangential seats is shown in U.S. Pat. No. 4,218,159.

Milling tools for gear milling are provided in different tolerance classes according to the German standard DIN. The finest class is AAA. Then the classes AA, A, B, C, D follow. The tolerance classes A and B are required for the manufacture of gear wheels for gearboxes for motor vehicles. For the milling tool according to the present invention, at least tolerance class B is aimed at.

SUMMARY OF THE INVENTION

A problem of the previously known milling tools is the difficulty of manufacturing milling inserts that have such a size that they are suitable for the production of workpieces having large or deep gashes, or workpieces having great cogs, for instance greater than Mn=6. There are manufacturing technical limitations for how large milling inserts that can be manufactured by sintering of milling inserts of cemented carbide. Today, available moulding machines only manage milling inserts of a limited size.

The object of the present invention is to solve this problem and enable a milling tool that has replaceable milling inserts and that thereby, in an economically favourable way, can be utilized for the cutting machining of great gashes, or cogs, for instance greater than Mn=6. Simultaneously, a high accuracy in the cutting machining of the workpieces, such as gashes or cogs, is sought.

This object is achieved by the milling tool that is mentioned by way of introduction and characterized in that the milling inserts comprise outer milling inserts, which project from the tool body by a first length from the rotation axis, and inner milling inserts, which project from the tool body by a second length from the rotation axis, and that the first length is considerably greater than the second length. The first length may be at least 3 mm greater than the second length, preferably 8-16 mm greater than the second length.

In a milling tool according to the invention, the outer milling inserts will act as root inserts and machine the root or bottom area of a gash, for instance between two adjacent cogs of the workpiece. The inner milling inserts will act as flank inserts and machine the outer flanks of the gash, such as two adjacent cogs, of the workpiece. The primary main cutting edges and the secondary main cutting edges of all milling inserts will machine each a side of a gash, for instance each a cog of the two adjacent cogs, of the workpiece. Accordingly, both the primary main cutting edge and the secondary main cutting edge are simultaneously in engagement with each a side of the gash, for instance each a cog, of the workpiece. The primary main cutting edge is the main cutting edge that first engages with a gash and machines the "front" side of the gash, while the secondary main cutting edge machines the "rear" side of the gash. The primary main cutting edge is loaded more than the secondary main cutting edge during the cutting machining.

Thanks to the fact that each milling insert is formed for engagement with only one gash of the workpiece, it is possible to position each milling insert in an optimal way in respect of the cutting machining and the tolerance level being aimed at for workpiece, such as the cogs, to be milled. Because each milling insert is replaceable, the tool body of the milling tool gets a very long service life without the need of maintenance. Only the milling inserts need to be replaced when the cutting edges are worn.

According to an embodiment of the invention, the succession line is a helix line having a constant pitch. Such a milling tool is suitable as a hobbing tool for gear milling, wherein the outer milling inserts will act as root inserts and machine the root or bottom area between two adjacent cog, and the inner milling inserts will act as flank inserts and machine the outer flanks of the two adjacent cogs.

According to an additional embodiment of the invention, the chip surface extends in an extension plane that comprises the primary main cutting edge and the secondary main cutting edge, the extension plane of each milling insert having a normal that is parallel to the tangent of the succession line where the same intersects the extension plane. Such a design contributes to the high tolerance level and to the fact that, in case of hobbing, the involute of the cogs can obtain the desired shape.

According to an additional embodiment of the invention, the milling inserts are arranged in a plurality of rows, each row comprising at least two milling inserts and extends along a respective line that is perpendicular to the tangent of the succession line. Advantageously, the extension plane of adjacent pairs of milling inserts in the same row forms an angle, or a constant angle, with each other for each pair of milling inserts. Differently expressed, the extension plane for each milling insert will lie in a unique plane, at least for each milling insert of each such row, but in practice also for all milling inserts of the tool.

According to an additional embodiment of the invention, the main cutting edges of the outer milling inserts and the main cutting edges of the inner milling inserts, in a projection, extend in a common plane where the tangent of the succession line forms a normal, along each a common line and along different but overlapping segments of said lines. In such a way, an even surface is guaranteed of the cog to be manufactured, i.e., the risk of a step or displacement of the surface can be avoided or at least be reduced.

According to an additional embodiment of the invention, said seats comprise outer seats, each one of which is formed for the receipt of one of the outer milling inserts, and inner seats, each one of which is formed for the receipt of one of the inner milling inserts. Advantageously, each one of the outer seats may comprise a protuberance that projects from the peripheral surface and that forms a part of the support surface of the outer seat for the outer milling insert. Such a protuberance extends the support surface outward from the tool body and thereby the support surface can provide a support to the milling insert during the machining.

According to an additional embodiment of the invention, the inner seats comprise an inner abutment surface, which extends upward from the support surface and against which the inner milling inserts abut. By such an abutment surface, the position of the inner milling inserts in the radial direction in respect of the rotation axis can be guaranteed with high accuracy. Advantageously, the inner milling inserts may be fastened in the seat by means of each a wedge-shaped block that presses the inner milling insert against the support surface and the abutment surface. The wedge-shaped block can be clamped against the inner milling insert by means of a screw, which may be double-threaded and which extends through the wedge-shaped block into a threaded hole in the tool body.

According to an additional embodiment of the invention, the outer seats comprise an inner abutment surface, which extends upward from the support surface and against which the outer milling inserts abut. By such an abutment surface, the position of the outer milling inserts in the radial direction in respect of the rotation axis can be guaranteed with high accuracy. Advantageously, the outer milling insert may be fastened in the seat by a wedge-shaped body corresponding to the one utilized for the inner milling insert. It is, however, also possible to provide the outer milling insert with a fastening hole that extends through the upper side and the under side, wherein the outer milling insert may be fastened in the seat by means of a fixing screw that extends through the fastening hole into a threaded hole that extends through the support surface into the tool body.

According to another embodiment of the invention, each outer milling insert is indexable by rotation around said axis, which forms a centre axis, between two opposite insert positions and comprises a first set, having a primary main cutting edge and a secondary main cutting edge for a first insert position, and a second set, having a primary main cutting edge and a secondary main cutting edge for a second insert position. In such a manner, the service life of the outer milling inserts can be extended and thereby the total economy for the milling tool can be further improved. Advantageously, the outer milling insert according to this embodiment may be fastened by means of a fixing screw that extends through a fastening hole in the tool body in the way explained above. In this case, the fastening hole forms a centre hole that is concentric with the centre axis.

According to an additional embodiment of the invention, the outer milling inserts and the inner milling inserts are arranged in an alternating order along the succession line in such a way that every other milling insert is an outer milling insert and every other one an inner milling insert. In such a manner, an even surface of the cogs to be manufactured is guaranteed. Thus, according to this embodiment, there is the same number of inner milling inserts and outer milling inserts. However, it should be noted that it is possible to have a different number of the inner and outer milling inserts, for instance, every third milling insert may be an inner milling insert or an outer milling insert. It is also possible to let the milling inserts comprise intermediate milling inserts that project by a third length from the rotation axis, said third length being smaller than the first length and greater than the second length. Said intermediate milling inserts will then also act as flank inserts but machine a portion of the cogs that is located between the portion that is machined by the inner milling inserts and the outer milling inserts. Such a design may be advantageous to very great cogs, for instance for Mn=18 and greater.

According to an additional embodiment of the invention, each outer milling insert comprises at least one transverse end cutting edge that extends between the primary main cutting edge and the secondary main cutting edge. The end cutting edge may be straight or comprise a straight segment having transition edges of a small radius of curvature to the respective main cutting edge. The end cutting edge has the purpose of machining the bottom surface between the two adjacent cogs that are machined by the primary main cutting edge and the secondary main cutting edge. The inner milling inserts comprise a transverse end edge that extends between the primary main cutting edge and the secondary main cutting edge. This end edge has no cutting function and will not be in engagement with the workpiece.

According to an additional embodiment of the invention, the extension plane forms an acute angle with the edge side at least in the vicinity of the primary main cutting edge and the secondary main cutting edge so that the milling insert obtains a positive cutting geometry, at least in respect of said main cutting edges, but preferably also in respect of the transverse end cutting edge. By such a positive cutting geometry, a high accuracy is guaranteed since the milling insert can be positioned in an optimal way in respect of the milling machining. The desired tolerance level can accordingly be achieved as the milling insert in a simple way is arranged in the milling tool so that the normal of the extension plane extends parallel to the tangent of the succession line. Thereby, the involute of the cogs of the workpiece to be manufactured can obtain the desired shape.

According to an additional embodiment of the invention, each milling insert comprises a symmetry line that is perpendicular to said axis, the primary main cutting edge and the secondary main cutting edge being symmetrical in respect of the symmetry line. Advantageously, the symmetry line may form a pressure angle $\alpha$ with each one of the primary main cutting edge and the secondary main cutting edge, the pressure angle $\alpha$ being in the interval of 18-32°. According to a first variant, the pressure angle $\alpha$ may be, for instance, 20°. According to a second variant, the pressure angle $\alpha$ may be, for instance, 30°.

According to an additional embodiment of the invention, the support surface of each seat comprises a projection that extends from the support surface and that is in engagement with a corresponding recess of the under side of the milling insert in such a way that the position of the milling insert is guaranteed. By such a projection, the position of the milling insert in the seat can be guaranteed in the radial and axial direction. Advantageously, the projection may comprise a radial elongate ridge, which has a primarily radial extension and guarantees the position of the milling insert in the axial direction. Such a radial elongate ridge is a sufficient complement to the above mentioned inner abutment surface so as to completely guarantee the position of the milling insert. Advantageously, the projection may comprise an axial elongate ridge, which has a primarily axial extension and which guarantees the position of the milling insert in the radial direction. Such an axial elongate ridge is advantageous as the seat lacks an inner abutment surface, for instance for an indexable milling insert, so as to, together with the radial elongate ridge, completely guarantee the position of the milling insert.

According to an additional embodiment of the invention, the angular distance between the extension plane of adjacent milling inserts along the succession line is equal for each pair of adjacent milling inserts.

The object mentioned above is also achieved by the milling insert kit that is mentioned by way of introduction and characterized in that the distance between the rear end points of the first milling insert is greater than the distance between the front end points of the second milling insert. Such a kit of milling inserts is advantageous for providing a gash milling tool, such as a gear milling tool or a slot milling tool with appropriate milling inserts, especially for maintaining a high accuracy also when milling a gash with a large size or a large depth. Additional embodiments of the milling insert kit may include features defined in claims 1 to 16 and above with respect to the first milling insert, configured to form the outer milling insert, and of the second milling insert, configured to form the inner milling insert.

BRIEF DESCRIPTION OF THE DRAWINGS

The invention will now be explained in more detail by a description of different embodiments, reference being made to the appended drawings.

FIG. 2 shows a first embodiment of the milling tool in FIG. 1 as seen in a side view.

FIG. 3 shows the milling tool in FIG. 2 as seen in an end view.

FIG. 9 shows a perspective view of a part of a milling tool according to a second embodiment.

FIG. 10 shows a perspective view of an inner milling insert of the milling tool in FIG. 9.

DETAILED DESCRIPTION OF DIFFERENT EMBODIMENTS

Figure 1:
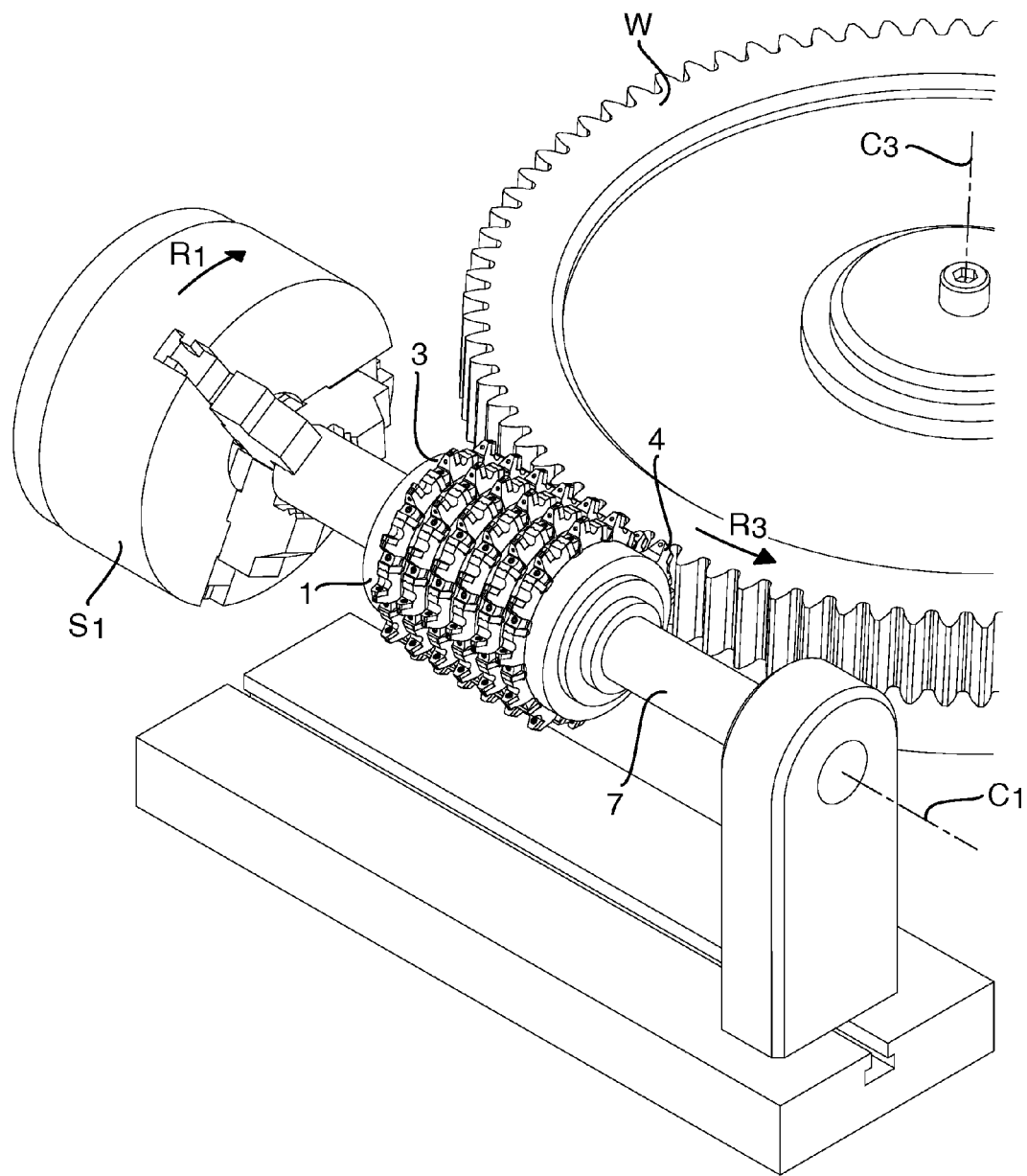
FIG. 1 schematically shows a perspective view of parts of a machine tool including a milling tool having a plurality of milling inserts according to the invention.

FIG. 1 shows schematically a first embodiment of a machine tool including a milling tool that is formed for gear cutting and more precisely for so-called hobbing of a workpiece W having cogs. The milling tool is suitable for the cutting machining of different workpieces W, such as gear wheels, racks, splines, impellers for hydraulic pumps, and similar cogged elements.

Figure 4:
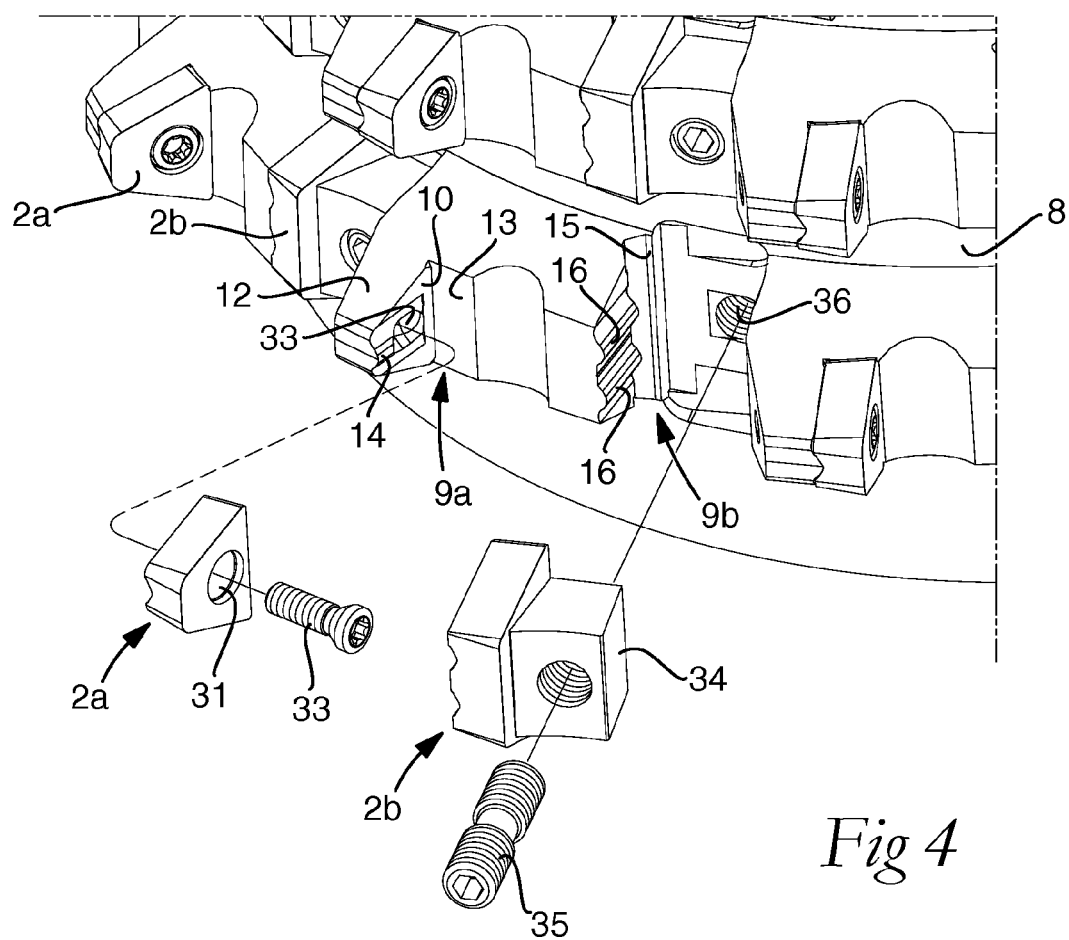
FIG. 4 shows a perspective view of a part of the milling tool in FIG. 2 on a greater scale.

A first embodiment of the milling tool is shown in FIGS. 2-4. The milling tool comprises a tool body 1, which may be manufactured from steel, and a large number of replaceable milling inserts 2a, 2b, which may be manufactured from a material that is harder than steel, for instance cemented carbide. The tool body 1 defines a rotation axis $C_1$ and has a first end 3 and an opposite second end 4. The rotation axis $C_1$ extends through the first end 3 and the second end 4.

The milling tool also comprises a through axial hole 5, see FIG. 3, having a straight groove 6 for the receipt of a rod 7, for instance in accordance with DIN 138. The rod 7 is formed for the fixing of the milling tool in a tool spindle S1 of a machine tool, such as a milling cutter or a multioperation machine, see FIG. 1. The tool body 1 is rotatable around the rotation axis $C_1$ in a direction of rotation $R_1$ (counter-clockwise rotation to the right as viewed from within the tool spindle $S_1$). The workpiece W is fixed in a workpiece spindle (not shown) and is rotatable around a rotation axis $C_3$ in a direction of rotation $R_3$.

The tool body 1 has a peripheral surface 8 that extends around the rotation axis $C_1$ between the first end 3 and the second end 4, see FIG. 2. The tool body 1 comprises a large number of separated seats 9a, 9b, see particularly FIG. 4, which are arranged at the peripheral surface 8. The tool body 1 may, for instance, comprise at least 30 seats 9a, 9b, preferably at least 100-300 seats 9a, 9b. Each seat 9a, 9b is formed to receive one of the milling inserts 2a, 2b. The seats 9a, 9b, and the milling inserts 2a, 2b, are arranged one after the other along a succession line x configured as a helix line having a constant pitch, see FIG. 2. In the embodiments shown, the pitch direction of the succession line x is to the right. The pitch direction may also be to the left depending on the cog to be manufactured. The pitch angle β may be 1-10°.

Each seat 9a, 9b comprises a support surface 10 that is arranged to allow or form a support to the milling insert 2a, 2b that, when it is mounted in the seat 9a, 9b, projects from the tool body 1 for cutting engagement with a gash of the workpiece W, see FIG. 1.

Thus, the seats 9a, 9b, and also the milling inserts 2a, 2b, are arranged in a plurality of rows. In the embodiments shown, the milling tool 24 comprises such rows of milling inserts 2a, 2b, see FIG. 3. However, it should be noted that the milling tool may comprise another number of rows of milling inserts 2a, 2b, for instance from 4 to more or essentially more than 24 rows. Each row comprises at least two milling inserts 2a, 2b and seats 9a, 9b. In the embodiments shown, each row comprises 6-7 milling inserts 2a, 2b and seats 9a, 9b.

Each row of milling inserts 2a, 2b, and seats 9a, 9b, extends along a respective line L that is perpendicular to the tangent of the succession line x, see FIG. 2. The distance between adjacent rows of seats 9a, 9b and milling inserts 2a, 2b is equidistant, i.e., said distance is equal for each pair of rows. Furthermore, also the distance between adjacent milling inserts 2a, 2b along the succession line x is equidistant, i.e., also this distance is equal for each pair of adjacent milling inserts 2a, 2b. More precisely, the angular distance between the extension plane p of adjacent milling inserts 2a, 2b along the succession line x is equidistant, i.e., equal for each pair of adjacent milling inserts 2a, 2b.

The milling inserts 2a, 2b comprise two types of milling inserts, viz. first milling inserts forming outer milling inserts 2a and second milling inserts forming inner milling inserts 2b. The outer milling inserts 2a project from the tool body 1 by a first length a from the rotation axis $C_1$. The inner milling inserts 2b project from the tool body 1 by a second length b from the rotation axis $C_1$. As can be seen in particularly FIG. 3, the first length a is considerably greater than the second length b. The seats 9a, 9b also comprise two types of seats, viz. outer seats 9a and inner seats 9b. Each one of the outer seats 9a is formed for the receipt of one of the outer milling inserts 2a, and each one of the inner seats 9b is formed for the receipt of one of the inner milling inserts 2b, see particularly FIG. 4. Thus, the outer seats 9a are situated in a position radially outside the inner seats 9b. One or more of the first milling inserts 2a and one or more of the second milling inserts 2b form a milling insert kit that may be provided for a tool body 1 as disclosed herein.

In the embodiments shown, the outer milling inserts 2a and the inner milling inserts 2b are arranged in an alternating order along the succession line x in such a way that every second milling insert is an outer milling insert 2a and every second one an inner milling insert 2b. In the embodiments shown, this means that every second row is a row of outer milling inserts 2a and every second one a row of inner milling inserts 2b, see particularly FIG. 3. Thus, according to the embodiments shown, the number of inner milling inserts 2a is equal to the number of outer milling inserts 2b. However, it should be noted that it could be possible to have a different number of the inner and outer milling inserts 2a, 2b. For example, every third milling insert may be an inner milling insert 2b or an outer milling insert 2a.

Each one of the outer seats 9a comprises a protuberance 12 that projects from the peripheral surface 8 of the tool body 1. The protuberance 12 forms a part of the support surface 10 for the outer milling insert 2a. In the first embodiment, see FIG. 4, each one of the outer seats 9a comprises an inner abutment surface 13 that extends upward from the support surface 10. The inner abutment surface 13 forms a support to the outer milling insert 2a abutting against the inner abutment surface 13 so that the radial position of the outer milling insert 2a in respect of the rotation axis $C_1$ is guaranteed.

The support surface 10 of each outer seat 9a comprises a projection, preferably in the form of a radial elongate ridge 14, which extends from the support surface 10. The radial elongate ridge 14 has two leaning flank surfaces that extend between the support surface 10 and an upper surface of the radial elongate ridge 14. The two flank surfaces form an obtuse angle with each other. This angle may be 90-140°, for instance 120°. The upper surface may be plane and parallel to the support surface 10.

Each one of the inner seats 9b comprises an inner abutment surface 15 that extends upward from the support surface 10. The inner abutment surface 15 forms a support to the inner milling insert 2b abutting against the inner abutment surface 15 so that the radial position of the inner milling insert 2b in respect of the rotation axis $C_1$ is guaranteed.

The support surface 10 of each inner seat 9b comprises a projection, preferably in the form of two radial elongate ridges 16 that extend from the support surface 10. Each one of the radial elongate ridges 16 has two leaning flank surfaces that extend between the support surface 10 and an upper surface of the radial elongate ridge 16. The two flank surfaces form an obtuse angle with each other. This angle may be 90-140°, for instance 120°. The upper surface may be plane and parallel to the support surface 10. It should be noted that it is possible to vary the number of radial elongate ridges 14, 16 of the inner and outer seats 9a, 9b. For example, the support surface 10 of the inner seat 9b may comprise only one radial elongate ridge 16.

Each milling insert 2a, 2b, see FIGS. 5a-5d and 6a-6d, comprises an under side 21, an opposite upper side 22 that forms a chip surface, a circumferential edge side 23 that connects the upper side 22 and the under side 21. An axis A extends through the upper side 22 and the under side 21. Each milling insert 2a, 2b comprises at least one primary main cutting edge 24 and a secondary main cutting edge 25, which converge to each other and are formed where the edge side 23 meets the upper side 22.

The chip surface, which is formed of and, in the embodiments shown, coincides with the upper side 22, extends in an extension plane p that comprises the primary main cutting edge 24 and the secondary main cutting edge 25. The extension plane p of each milling insert 2a, 2b has a normal that is parallel to the tangent of the succession line x where the same intersects the extension plane p.

Each milling insert 2a, 2b comprises a symmetry line S that is perpendicular to the axis A. The primary main cutting edge 24 and the secondary main cutting edge 25 are symmetrical in respect of the symmetry line S. The symmetry line S forms a pressure angle α with each one of the primary main cutting edge 24 and the secondary main cutting edge 25. The pressure angle α is in the interval of 18-32° and may, for instance, be about 20° or about 30°.

The extension plane p forms an acute angle with the edge side 23 at least in the vicinity of the main cutting edges 24, 25 so that the milling insert 2a, 2b obtains a positive cutting geometry.

Each outer milling insert 2a, see FIGS. 5a-5d, comprises a transverse end cutting edge 26 that extends between the primary main cutting edge 24 and the secondary main cutting edge 25. The primary main cutting edge 24 and the secondary main cutting edge 25 of the outer milling insert 2a are symmetrically arranged on a respective side of the symmetry line S to converge from a pair of rear end points Ra to a pair of forward end points Fa or to the transverse end cutting edge 26 into which they transform. The extension plane p forms an acute angle with the edge side 23 also in the vicinity of the end cutting edges 26 so that the outer milling insert 2a obtains a positive cutting geometry also in respect of the end cutting edge 26 that is in cutting engagement with the bottom surface between adjacent cogs of the workpiece W.

Each inner milling insert 2b, see FIGS. 6a-6d, comprises a transverse end edge 27 that extends between the primary main cutting edge 24 and the secondary main cutting edge 25. The end edge 27 has no cutting function and will not be in engagement with the workpiece W. The primary main cutting edge 24 and the secondary main cutting edge 25 of the inner milling insert 2b are symmetrically arranged on a respective side of the symmetry line S to converge from a pair of rear end points Rb to a pair of forward end points Fb or to the transverse end edge 27 into which they transform.

Figure 5A:
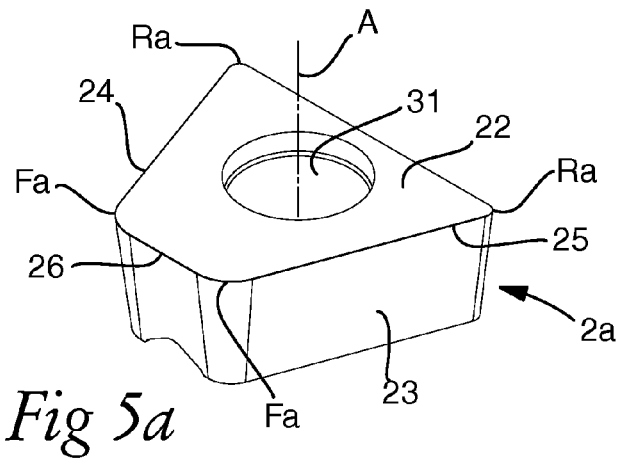
FIGS. 5a-5d show four views of an outer milling insert of the milling tool in FIG. 4.
Figure 5B:
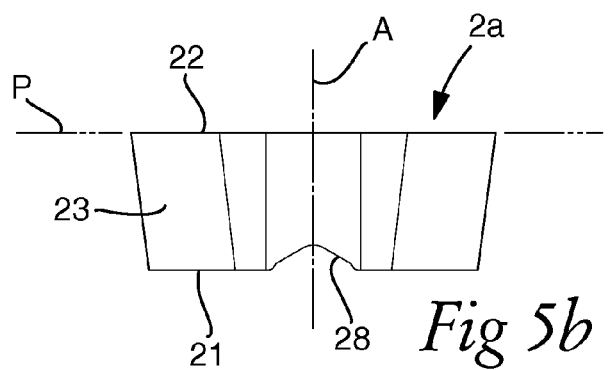
Figure 5C:
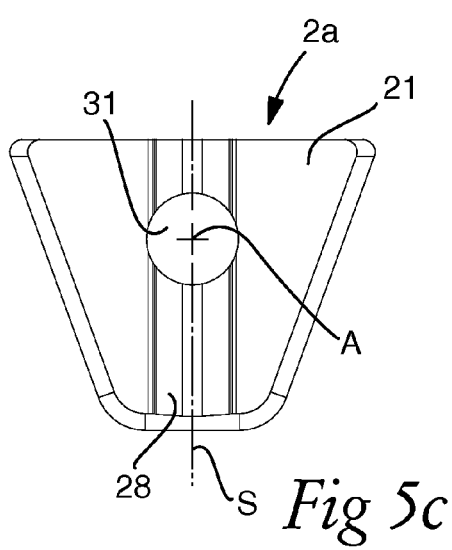
Figure 5D:
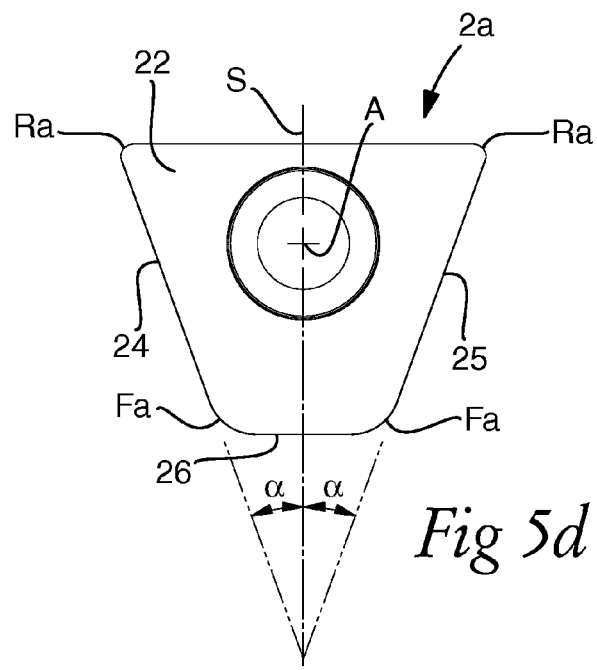

Each outer milling insert 2a, see particularly FIG. 5c, has a recess in the form of an elongate valley 28. When the outer milling insert 2a is mounted in the outer seat 9a, the radial elongate ridge 14 is in engagement with the elongate valley 28 of the under side 21 of the outer milling insert 2a in such a way that the axial position of the outer milling insert 2a in respect of the rotation axis $C_1$ is guaranteed. The elongate valley 28 has two leaning flank surfaces that extend between the under side 21 of the outer milling insert 2an and a bottom surface that may be plane and parallel to the under side 21. When the outer milling insert 2a is mounted in the outer seat 9a, the flank surfaces of the radial elongate ridge 14 will abut against one each of the flank surfaces of the elongate valley 28. Advantageously, there may be a gap between the upper surface of the ridge 14 and the bottom surface of the valley 28.

Figure 6A:
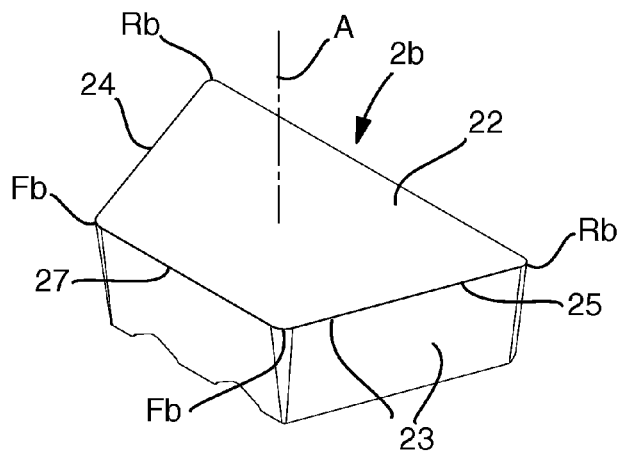
FIGS. 6a-6d show four views of an inner milling insert of the milling tool in FIG. 4.
Figure 6B:
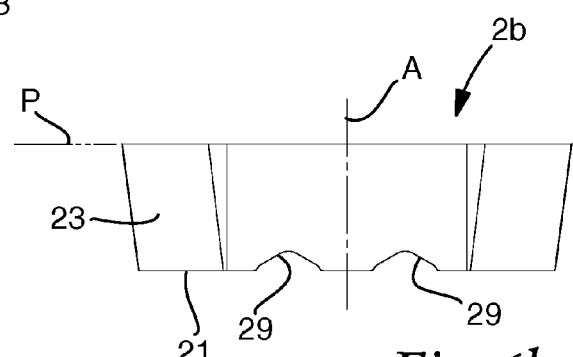
Figure 6C:
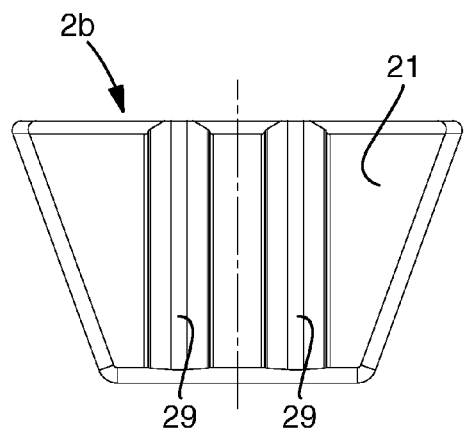
Figure 6D:
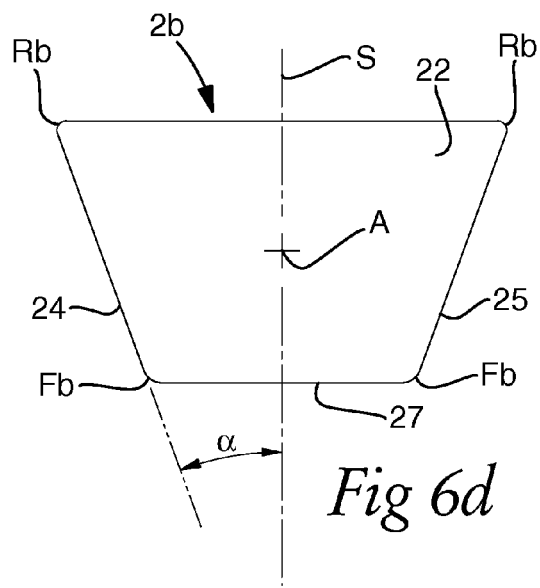

Each inner milling insert 2b, see particularly FIG. 6c, has a recess in the form of two elongate valleys 29. When the inner milling insert 2b is mounted in the inner seat 9b, the radial elongate ridges 16 are in engagement with each an elongate valley 29 of the under side 21 of the inner milling insert 2b in such a way that the axial position of the inner milling insert 2b in respect of the rotation axis $C_1$ is guaranteed. Each one of the elongate valleys 29 has two leaning flank surfaces that extend between the under side 21 of the inner milling insert 2b and a bottom surface that may be plane and parallel to the under side 21. When the inner milling insert 2b is mounted in the inner seat 9b, the flank surfaces of the radial elongate ridges 16 will abut against one each of the flank surfaces of the elongate valleys 29. Advantageously, there may be a gap between the upper surface of the ridges 16 and the bottom surface of the valleys 29. It should be noted that the number of elongate valleys 28, 29 of the outer and inner milling inserts 2a, 2b naturally corresponds to the number of radial elongate ridges 14, 16 of the outer and inner seats 9a, 9b.

Each outer milling insert 2a of the first embodiment comprises a fastening hole 31 that extends parallel to the axis A through the upper side 22 and the under side 21. The outer milling insert 2a is fastened in the outer seat 9a against the support surface 10 by means of a fixing screw 32 that extends through the fastening hole 31 into a threaded hole 33 that extends through the support surface 10, see FIG. 4.

Each inner milling insert 2b is fastened in the inner seat 9b against the support surface 10 by means of a wedge-shaped block 34 that abuts against the upper side 22 of the inner milling insert 2b and presses the inner milling insert 2b against the support surface 10 and the inner abutment surface 15. The wedge-shaped block 34 is clamped against the inner milling insert 2b by means of a double-threaded screw 35 that extends through and is in engagement with the wedge-shaped block 34 and into a threaded hole 36 in the tool body 1, see FIG. 4.

Figure 7:
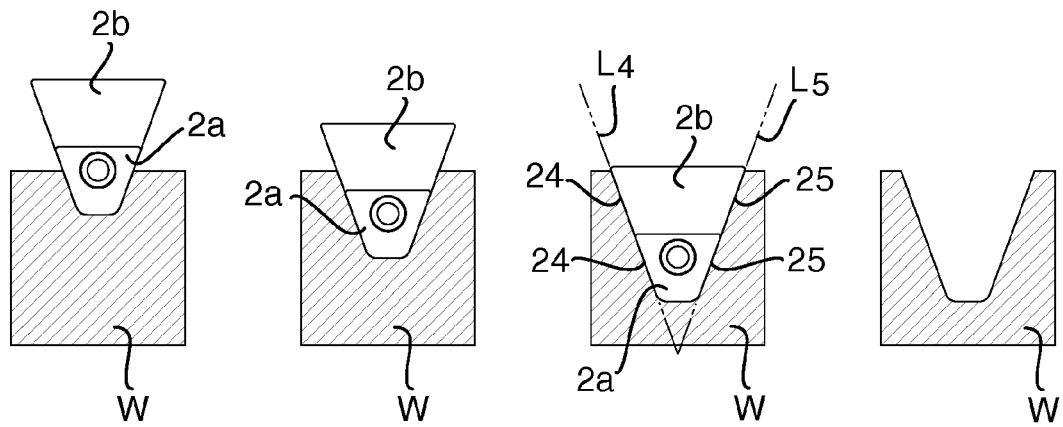
FIG. 7 schematically shows a view from the front of the engagement of a milling insert of the milling tool in FIG. 4 into a workpiece in different positions.
Figure 8:
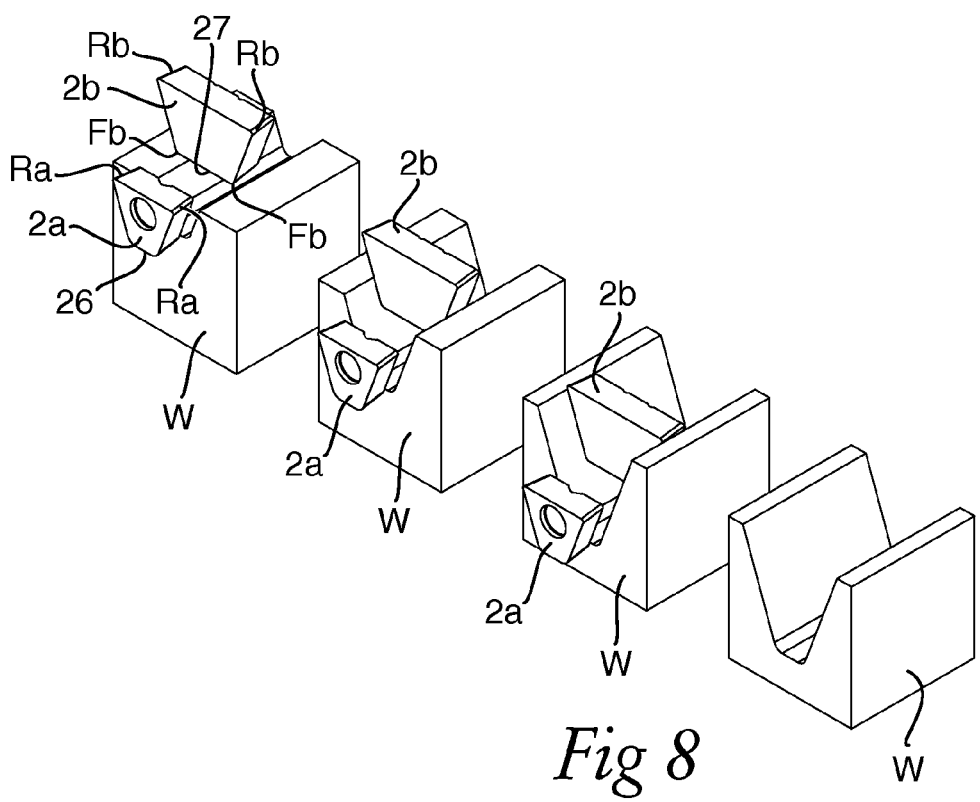
FIG. 8 schematically shows a perspective view of the engagements in FIG. 5.
Figure 11A:
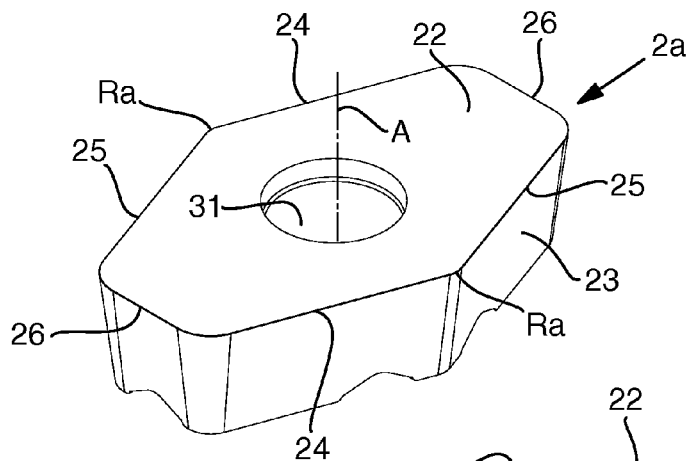
FIGS. 11a-11d show four views of an outer milling insert of the milling tool in FIG. 9.
Figure 11B:
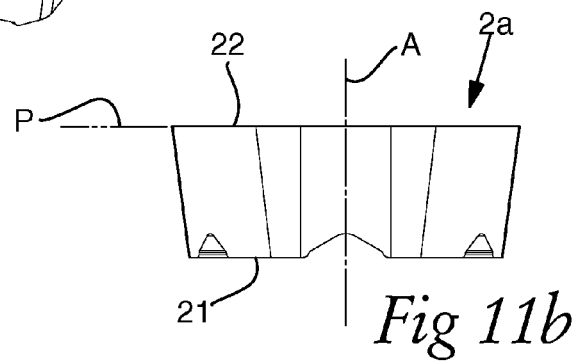
Figure 11C:
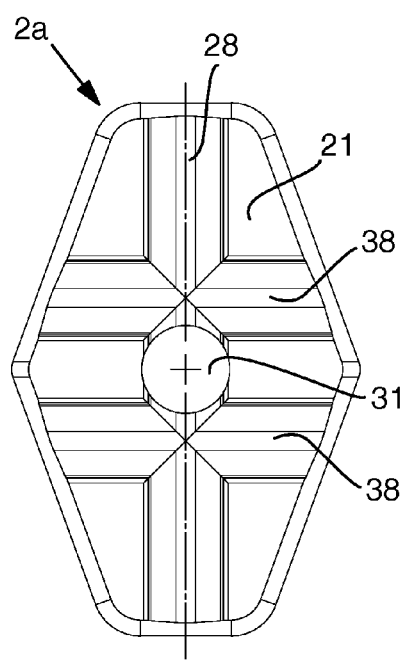
Figure 11D:
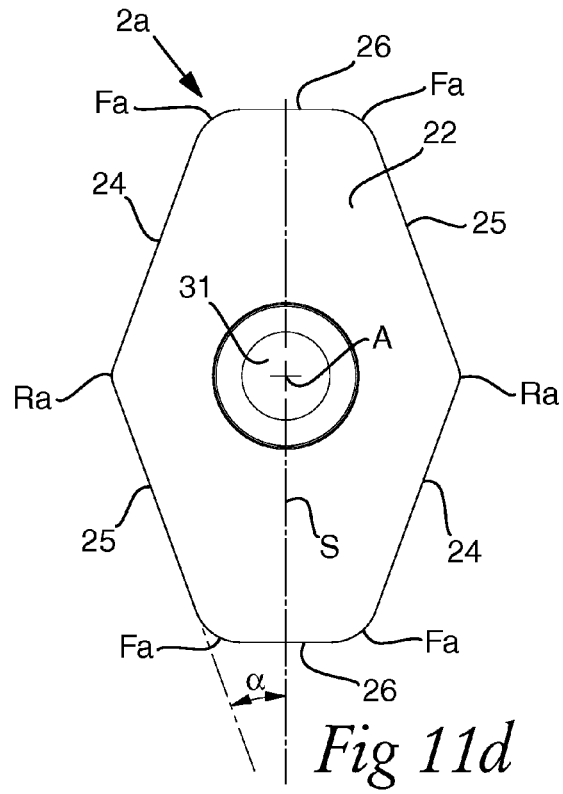

When the milling tool according to the first embodiment is used, the outer milling inserts 2a will machine a root area, i.e., the inner flank surfaces of two adjacent cogs and the bottom surface between two adjacent cogs, of the workpiece W while the inner milling inserts 2b will machine the outer flanks of the two adjacent cogs. The engagement of the milling inserts 2a, 2b with the workpiece W is illustrated in FIGS. 7 and 8. As is seen, the main cutting edges 24, 25 of the outer milling inserts 2a and the main cutting edges 24, 25 of the inner milling inserts 2b will, in a projection, extend along each a common line $L_4$ and $L_5$, respectively, and along different but overlapping segments of said lines $L_4$, $L_5$. The overlapping should be as short as possible but a certain overlapping is important to reduce the risk of grooves or steps in the flank surface of the cogs to be manufactured.

As also can be seen in FIGS. 7 and 8, the distance, or the shortest distance, between the rear end points of the first milling insert 2a is greater than the distance, or the shortest distance, between the front end points of the second milling insert 2b.

FIGS. 9 and 10a-10d illustrate a second embodiment of the invention that differs from the first embodiment in that each outer milling insert 2a is indexable by rotation around the axis A, which in this case forms a centre axis. The outer milling insert 2a is indexable between two opposite insert positions and comprises a first set, having a primary main cutting edge 24 and a secondary main cutting edge 25 for a first insert position, and a second set, having a primary main cutting edge 24 and a secondary main cutting edge 25 for a second insert position. In this embodiment, the rear end points for each set of main cutting edges 24, 25 are located at the transition between the first set and the second set.

In the second embodiment, the outer seats 9a lack an inner abutment surface but instead comprise an axial elongate ridge 37 of the support surface 10. The outer milling insert 2a has two corresponding elongate valleys 38 that extend from the under side 21, see particularly FIG. 10c. When the outer milling insert 2a is mounted in the outer seat 9a, the axial elongate ridge 37 will be in engagement with the elongate valley 38 of the under side 21 of the outer milling insert 2an so that the radial position of the outer milling insert 2a in respect of the rotation axis $C_1$ is guaranteed. The axial elongate ridge 37 has, as the ridge 14, two leaning flank surfaces that extend between the support surface 10 and an upper surface of the radial elongate ridge 37. The two flank surfaces form an obtuse angle with each other. This angle may be 90-140°, for instance 120°. The upper surface may be plane and parallel to the support surface 10. Each one of the elongate valleys 38 has, as the elongate valley 28, two leaning flank surfaces that extend between the under side 21 of the outer milling insert 2an and a bottom surface that may be plane and parallel to the under side 21. When the outer milling insert 2a is mounted in the outer seat 9a, the flank surfaces of the axial elongate ridge 37 will abut against one each of the flank surfaces of the elongate valley 38. Also in this case, there is a gap between the upper surface of the ridge 37 and the bottom surface of the valley 38.

An additional difference between the first and second embodiment is that, in the latter, also the inner seat 9b lacks an inner abutment surface and instead comprises an axial ridge 39 that is in engagement with an elongate valley 40 of the under side of the inner milling insert 2b, see FIG. 9. The ridge 39 and the valley 40 are formed as other ridges and valleys with two flank surfaces and an upper surface and a bottom surface, respectively.

Figure 12:
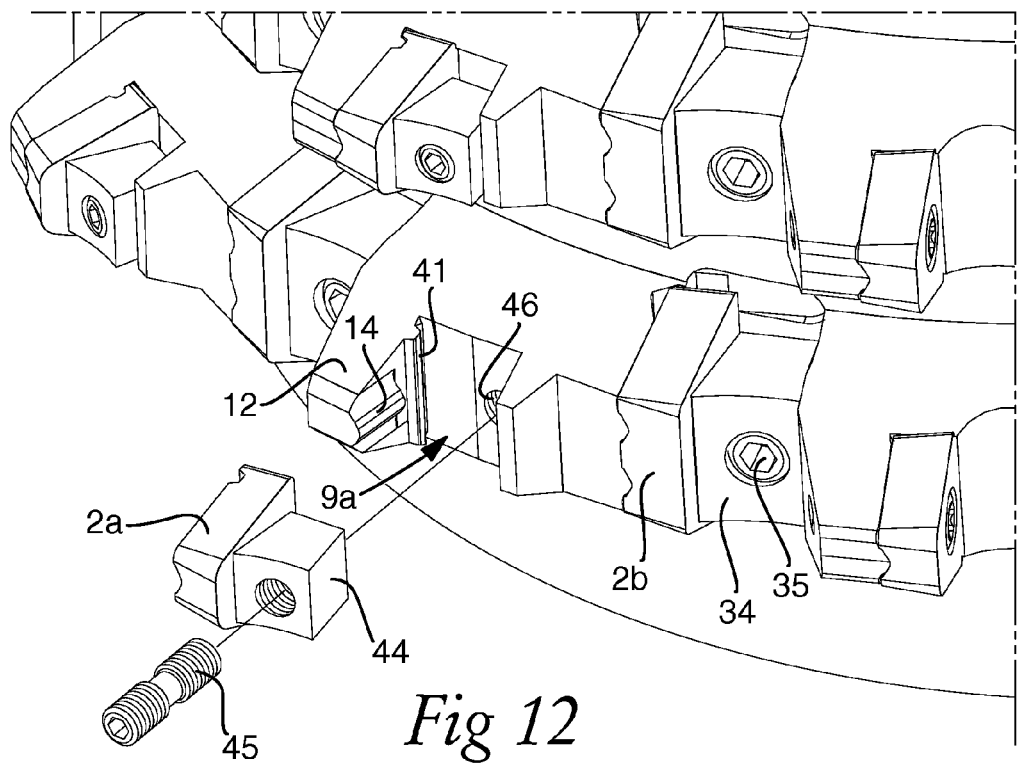
FIG. 12 shows a perspective view of a part of a milling tool according to a third embodiment.
Figure 13:
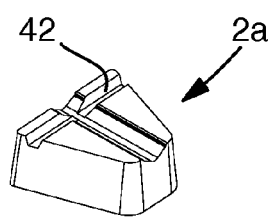
FIG. 13 shows a view from below of an outer milling insert of the milling tool in FIG. 12.

FIGS. 12 and 13 illustrate a third embodiment of the invention that differs from the first embodiment in that each one of the outer seats 9a lacks an inner abutment surface and instead comprises an axial elongate ridge 41 of the support surface 10. The outer milling insert 2a has a corresponding elongate valley 42 that extends from the under side 21, see FIG. 13. When the outer milling insert 2a is mounted in the outer seat 9a, the axial elongate ridge 41 will be in engagement with the elongate valley 42 of the under side 21 of the outer milling insert 2an so that the radial position of the outer milling insert is guaranteed in respect of the centre axis $C_1$.

An additional difference between the first and third embodiment is that, in the latter, the outer milling insert 2a lacks fastening hole and instead is fastened in the outer seat 9a by means of a wedge-shaped block 44 that abuts against the upper side 22 of the outer milling insert 2an and presses the outer milling insert 2a against the support surface 10 and the two elongate ridges 14 and 41. The wedge-shaped block 44 is clamped against the outer milling insert 2a by means of a double-threaded screw 45 that extends through and is in engagement with the wedge-shaped block 44 and into a threaded hole 46 in the tool body 1.

In the third embodiment, the inner seat 9b and the inner milling insert 2b are formed in the same way as in the second embodiment.

In a fourth embodiment the succession line x extends around the $C_1$ in a plane being perpendicular to the rotation axis $C_1$, i.e. the pitch is zero. Such a milling tool is suitable milling of gashes or slots or other grooves, especially with a straight extension, for instance gashes of splines. The milling tool according to the fourth embodiment may comprise a set of inserts 2a, 2b along one such succession line x, or several succession lines x being parallel with each other.

The invention is not limited to the embodiments described above but may be modified and varied within the scope of the subsequent claims.

According to an additional embodiment, the milling tool may also comprise intermediate milling inserts that project by a third length from the rotation axis. The third length is smaller than the first length and greater than the second length. The intermediate milling inserts act as flank inserts but machine a portion of the cogs that is located between the portion that is machined by the inner milling inserts and the outer milling inserts. Such an embodiment may be advantageous to very great cogs, for instance for Mn=18 and greater.

It should also be noted that the different embodiments can be combined with each other. For instance, the indexable milling insert 2a of the second embodiment can replace the outer milling insert 2a of the third embodiment. In all embodiments, the radial position of the inner milling insert 2b can be guaranteed by the inner abutment surface 15 or the axial elongate ridge 39. It would also be possible to attach the inner milling insert 2b by means of a fixing screw that extends through the inner milling insert 2b.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

| List of reference designations | |
|---|---|
| 1 | tool body |
| 2a | outer milling insert |
| 2b | inner milling insert |
| 3 | first end |
| 4 | second end |
| 5 | hole |
| 6 | rod |
| 7 | groove |
| 8 | peripheral surface |
| 9a | outer seat |
| 9b | inner seat |
| 10 | support surface |
| 12 | protuberance |
| 13 | inner abutment surface |
| 14 | elongate ridge |
| 15 | inner abutment surface |
| 16 | elongate ridge |
| 21 | under side |
| 22 | upper side |
| 23 | edge side |
| 24 | primary main cutting edge |
| 25 | secondary main cutting edge |
| 26 | transverse end cutting edge |
| 27 | transverse end edge |
| 28 | elongate valley |
| 29 | elongate valley |
| 31 | fastening hole |
| 32 | fixing screw |
| 33 | threaded hole |
| 34 | wedge-shaped block |
| 35 | double-threaded screw |
| 36 | threaded hole |
| 37 | axial elongate ridge |
| 38 | elongate valley |
| 39 | axial elongate ridge |
| 40 | elongate valley |
| 41 | axial elongate ridge |
| 42 | elongate valley |
| 44 | wedge-shaped block |
| 45 | double-threaded screw |
| 46 | threaded hole |
| W | workpiece |
| $C_1$ | rotation axis |
| $R_1$ | direction of rotation |
| $C_3$ | rotation axis |
| $R_3$ | direction of rotation |
| $S_1$ | tool spindle |
| A | axis |
| S | symmetry line |
| p | extension plane |
| x | succession line |
| β | pitch angle |
| $L_4$ | line |
| $L_5$ | line |
| Ra | rear end point |
| Fa | forward end point |
| Rb | rear end point |
| Fb | forward end point |

The invention claimed is:

1. Milling tool formed for gash milling, comprising
a tool body that defines a rotation axis and has a first end, an opposite second end, and a peripheral surface that extends around the rotation axis between the first end and the second end;
a large number of separated seats that are arranged one after the other in the tool body along a succession line; and a corresponding large number of replaceable milling inserts each one of which comprises an under side, an opposite upper side that forms a chip surface, a circumferential edge side that connects the upper side and the under side, an insert axis that extends through the upper side and the under side, and at least one primary main cutting edge and a secondary main cutting edge, which converge to each other and are formed where the edge side meets the upper side, wherein each seat comprises a support surface for the receipt of the under side and an inner abutment surface for the receipt of an edge side of one of the milling inserts, each milling insert projecting from the tool body for cutting engagement with a gash of said workpiece, wherein the milling inserts comprise outer milling inserts, which project from the tool body by a first length from the rotation axis, and inner milling inserts, which project from the tool body by a second length from the rotation axis, wherein the first length is considerably greater than the second length, wherein the converging primary main cutting edge and secondary main cutting edge of any one inner milling insert are axially separated relative to the rotation axis by the succession line for the seat for that one inner milling insert, wherein said seats comprise outer seats, each one of which is formed for the receipt of one of the outer milling inserts, and inner seats, each one of which is formed for the receipt of one of the inner milling inserts, and wherein the inner abutment surface of outer seats are radially more distant from the rotation axis than the inner abutment surface of inner seats.

2. Milling tool according to claim 1, wherein the succession line is a helix line having a constant pitch.

3. Milling tool according to claim 1, wherein the chip surface extends in an extension plane that comprises the primary main cutting edge and the secondary main cutting edge, and wherein the extension plane of each milling insert has a normal that is parallel to the tangent of the succession line where the same intersects the extension plane.

4. Milling tool according to claim 1, wherein the main cutting edges of the outer milling inserts and the main cutting edges of the inner milling inserts, in a projection, extend along each .a common line and along different but overlapping segments of said lines.

5. Milling tool according to claim 1, wherein each one of the outer seats comprises a protuberance that projects from the peripheral surface and that forms a part of the support surface of the outer seat for the outer milling insert.

6. Milling tool according to claim 1, wherein the inner abutment surface extends from the support surface and the inner milling inserts abut against the inner abutment surface.

7. Milling tool according to claim 1, wherein the inner abutment surface extends from the support surface and the outer milling inserts abut against the inner abutment surface.

8. Milling tool according to claim 1, wherein each outer milling insert is indexable by rotation around said insert axis, which forms a centre axis, main cutting edge and a secondary main cutting edge for a first insert position, and a second set having a primary main cutting edge and a secondary main cutting edge for a second insert position.

9. Milling tool according to claim 1, wherein the outer milling inserts and the inner milling inserts are arranged in an alternating order along the succession line in such a way that a first group of every second milling insert is an outer milling insert and a second group of every second milling insert is an inner milling insert.

10. Milling tool according to claim 1, wherein each outer milling insert comprises at least one transverse end cutting edge that extends between the primary main cutting edge and the secondary main cutting edge.

11. Milling tool according to claim 3, wherein the extension plane forms an acute angle with the edge side at least in the vicinity of the main cutting edges so that the milling insert obtains a positive cutting geometry.

12. Milling tool according to claim 1, wherein each milling insert comprises a symmetry line that is perpendicular to said insert axis, and wherein the primary main cutting edge and the secondary main cutting edge are symmetrical in respect of the symmetry line.

13. Milling tool according to claim 12, wherein the symmetry line forms a pressure angle $\alpha$ with each one of the primary main cutting edge and the secondary main cutting edge, and wherein the pressure angle $\alpha$ is in the interval of 18-32°.

14. Milling tool according to claim 1, wherein the support surface of each seat comprises a projection that extends from the support surface and that is in engagement with a corresponding recess of the under side of the milling insert in such a way that the position of the milling insert is guaranteed.

15. Milling tool according to claim 3, wherein the angular distance between the extension plane of adjacent milling inserts along the succession line is equal for each pair of adjacent milling inserts.

16. Milling insert kit for gash milling tool, comprising
a first milling insert comprising a symmetry line and having a primary main cutting edge and a secondary main cutting edge, which are symmetrically arranged on a respective side of the symmetry line to converge from a pair of rear end points to a transverse end cutting edge into which they transform, wherein each one of the primary cutting edge and the secondary cutting edge forms a pressure angle in respect of the symmetry line; and
a second milling insert comprising a symmetry line and having a primary main cutting edge and a secondary main cutting edge, which are symmetrically arranged on a respective side of the symmetry line to converge from a pair of rear end points to a pair of forward end points, wherein each one of the primary cutting edge and the secondary cutting edge forms a pressure angle in respect of the symmetry line,
wherein the pressure angle is equal for the first milling insert and the second milling insert, and
wherein the distance between the rear end points of the first milling insert is greater than the distance between the front end points of the second milling insert.

17. Milling tool according to claim 1, wherein the first length is 8 to 16 mm greater than the second length and wherein the number of separated seats and number of replaceable milling inserts is at least 30.

18. A milling tool formed for gash milling, comprising
a tool body that defines a rotation axis and has a first end, an opposite second end, and a peripheral surface that extends around the rotation axis between the first end and the second end;
a plurality of separated seats arranged one after the other in the tool body along a succession line, the plurality of separate seats including a first group of outer milling insert seats and a second group of inner milling insert seats; and a plurality of replaceable milling inserts including a first milling insert type and a second milling insert type, wherein the first milling insert type includes a primary main cutting edge and a secondary main cutting edge and a first symmetry line, the primary main cutting edge and the secondary main cutting edge symmetrically arranged on a respective side of the first symmetry line to converge from a pair of rear end points to a transverse end cutting edge into which they transform, wherein each one of the primary cutting edge and the secondary cutting edge forms a first pressure angle in respect of the first symmetry line, and wherein the second milling insert type includes a primary main cutting edge and a secondary main cutting edge and a second symmetry line, the primary main cutting edge and the secondary main cutting edge symmetrically arranged on a respective side of the second symmetry line to converge from a pair of rear end points to a pair of forward end points, wherein each one of the primary cutting edge and the secondary cutting edge forms a second pressure angle in respect of the second symmetry line, wherein a value of the first pressure angle is equal to a value of the second pressure angle, and wherein a distance between the rear end points of the first milling insert type is greater than a distance between the front end points of the second milling insert type.

19. The milling tool according to claim 18, wherein replaceable milling inserts of the first milling insert type are seated in the first group of outer milling insert seats and replaceable milling inserts of the second milling insert type are seated in the second group of inner milling insert seats.

20. The milling tool according to claim 18, wherein the converging primary main cutting edge and secondary main cutting edge of replaceable milling inserts of the second milling insert type are axially separated relative to the rotation axis by the succession line, and wherein an inner abutment surface of the first group of outer milling insert seats are radially more distant from the rotation axis than an inner abutment surface of the second group of inner milling insert seats.

* * * * *